(12) United States Patent
Morejon et al.

(10) Patent No.: US 6,925,112 B1
(45) Date of Patent: Aug. 2, 2005

(54) DISCRETE MULTITONE MODEM INITIALIZATION SYSTEM AND METHOD

(75) Inventors: Israel Morejon, St. Petersburg, FL (US); Jwalant Dholakia, St. Petersburg, FL (US); Yueping Zeng, St. Petersburg, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 0 days.

(21) Appl. No.: 10/065,635

(22) Filed: Nov. 5, 2002

Related U.S. Application Data

(63) Continuation-in-part of application No. 10/064,570, filed on Jul. 26, 2002.

(51) Int. Cl.[7] .............................................. H04B 1/38
(52) U.S. Cl. .................................................. 375/222
(58) Field of Search ............................... 375/222, 219, 375/224, 262, 341, 316, 295, 354, 358; 379/93.1, 379/27; 370/225, 512, 514

(56) References Cited

U.S. PATENT DOCUMENTS

| | | | |
|---|---|---|---|
| 5,627,863 A | | 5/1997 | Aslanis et al. |
| 5,901,180 A | * | 5/1999 | Aslanis et al. ............... 375/261 |
| 5,991,330 A | * | 11/1999 | Dahlman et al. ........... 375/149 |
| 6,002,722 A | | 12/1999 | Wu |
| 6,002,729 A | | 12/1999 | Schmidt |
| 6,137,848 A | | 10/2000 | Ho et al. |
| 6,185,251 B1 | * | 2/2001 | Fertner ....................... 375/231 |
| 6,219,378 B1 | | 4/2001 | Wu |
| 6,359,878 B1 | | 3/2002 | Lakkis et al. |
| 6,359,933 B1 | * | 3/2002 | Aslanis et al. ............... 375/260 |
| 6,430,171 B1 | * | 8/2002 | Ogami et al. ................ 370/342 |
| 6,438,186 B1 | * | 8/2002 | Strait ......................... 375/354 |
| 6,459,744 B1 | | 10/2002 | Helard et al. |
| 2002/0105973 A1 | * | 8/2002 | Kato et al. ................... 370/503 |
| 2002/0150071 A1 | * | 10/2002 | Pollet et al. ................. 370/342 |

OTHER PUBLICATIONS

J.H. Dholakia, V.K. Jain and B.A. Meyers, Adaptive Equalization for 100Mbos OWSS Wireless LANS.
J.H. Dholakia and V.K. Jain, Technologies for 3G Wireless Communications.
Robert W. Chang, Synthesis of Band-Limited Orthogonal Signals for Multichannel Data Transmission.
S.B. Weinstein and Paul M. Ebert, Data Transmission by Frequency-Division Multiplexing Using the Discrete Fourier Transform.
Abraham Peled and Antonio Ruiz, Frequency Domain Data Transmission Using Reduced Computational Complexity Algorithms.
Multicarrier Modulation with Low PAR Application to DSL and Wireless, Kluwer Academic Publishers.
Thierry Pollet and Miquel Peeters, Synchronization with DMT Modulation.
Jan-Vaap Van De Beek, Mangus Sandell and per Ola Borjesson, ML Estimation of Time and Frequency Offset in OFDM Systems.
OFDM for Wireless Multimedia Communications, Artech Publishers.

(Continued)

*Primary Examiner*—Khai Tran
(74) *Attorney, Agent, or Firm*—Molly L. Sauter; Smith & Hopen, P.A.

(57) ABSTRACT

The present invention discloses an improved initialization method for modem communication wherein the timing offset required for synchronization is estimated utilizing an entire received DMT frame and the channel impulse response is estimated utilizing the pilot tones received within the same DMT frames utilized for synchronization.

66 Claims, 11 Drawing Sheets

OTHER PUBLICATIONS

Don Kyu Kim et al., A New Joint Algorithm of Symbol Timing Recovery and Sampling Clock Adjustment for OFDM Systems.

Yong-Jung Kim et al., A New Fast Symbol Timing Recovery Algorithm for OFDM Systems.

Denis J.G. Mestdagh, Mikael R. Isaksson and Per Odling, Zipper VDSL: A Solution for Robust Duplex Communication Over Telephone Lines.

Rohit Negi, Pilot Tone Selection for Channel Estimation in a Mobile OFDM System.

Hikmet Sari, Georges Karam and Isabelle Jeanclaude, Transmission Techniques for Digital Terrestrial TV Broadcasting.

Theory and Application of Digital Signal Processing, Prentice-Hall, Inc. 1975.

Henry K. Kwok and Douglas L. Jones, An Efficient Power-Reduction Technique on DSL Modems.

Y. Zeng and N.A. Holzwarth, Density-Functional Calculation of the Electronic Structure and Equilibrium Geometry of Iron Pyrite (FeS2).

G. David Forney, Jr. et al., Efficient Modulation for Band-Limited Channels.

Erik G. Larsson et al., Joint Symbol Timing and Channel Estimation for OFDM Based wLANs.

John A.C. Bingham, Multicarrier Modulation for Data Transmission: An Idea Whose Time Has Come.

* cited by examiner

FIG. 2

$$x_n = \sqrt{N} \sum_{k=0}^{N-1} X_k e^{j\frac{2\pi kn}{N}}, n = 0, \ldots, N-1 \quad\quad 2\text{-}1$$

where subscript $n$ and $k$ denote time index and sub-carrier index, respectively.

$\underline{X}^m$ is generated such $$\begin{cases} X^m{}_0 = X^m{}_N = 0 \\ X^m{}_k = a^m{}_k, k < N \\ X^m{}_{N+k} = (a^m{}_{N-k})^* \end{cases} \quad\quad 2\text{-}2$$

$$x^m{}_{-k} = x^m{}_{N-k} \quad\quad 2\text{-}3$$

If the Channel Impulse Response (CIR) is denoted by vector $\underline{h} = [h_0, \ldots, h_{N_c-1}]$, then the received signal can be written as $\quad\quad 2\text{-}4$ $$y_n = h_n x_n + n_n$$

where $n_n$ is the noise sample at $n$-th time instant.

$$Y_k = \frac{1}{\sqrt{N}} \sum_{n=0}^{N-1} x_n e^{-j\frac{2\pi kn}{N}}, k = 0, \ldots, N-1 \quad\quad 2\text{-}5$$

$$Y^m{}_k = H_k X^m{}_k + N^m{}_k, k = 0, \ldots, N-1 \quad\quad 2\text{-}6$$

Here, uppercase letters represent FFT of the corresponding time-domain signals.

FIG. 3

$$R(\hat{D}) = \sum_{n=0}^{LP-1} r(n+\hat{D}) r(n+N+\hat{D}); \quad \hat{D} = 0,1,\cdots,\hat{D}_{\max} \qquad \text{3-1}$$

where $r(n)$ is the received signal sample at $n$-th instant, $\hat{D}_{\max}$ is the maximum possible delay. From the correlation function values for various delays, $\hat{D}$ is selected where the function has the maximum value.

$$\{i, \quad i+N/L \quad \cdots \quad i+N-N/L\}, i = 0,1,\ldots,N/L-1. \qquad \text{3-2}$$

$$R^m_k = H_k + \frac{V^m_k}{|X^m_k|}, k = 0,\ldots,N-1 \qquad \text{3-3}$$

where $R^m_k = \dfrac{Y^m_k}{X^m_k}$ and $V^m_k = \dfrac{N^m_k}{e^{j\angle X^m_k}}$ Where vectors $\underline{\hat{h}} = [h_0 \quad h_1 \quad \cdots \quad h_{L-1}]$ and $\underline{R}_{pl} = [R_i \quad R_{i+N/L} \quad \cdots \quad R_{i+N-N/L}]$, and the matrix $Q_{pl}$ is defined as:

$$Q_{pl} = \frac{1}{\sqrt{N}} \begin{bmatrix} 1 & W_N^i & \cdots & W_N^{i(L-1)} \\ 1 & W_N^{(i+N/L)} & \cdots & W_N^{(i+N/L)(L-1)} \\ \cdots & \cdots & \cdots & \cdots \\ 1 & W_N^{(i+N-N/L)} & \cdots & W_N^{(i+N-N/L)(L-1)} \end{bmatrix} \qquad \text{3-4}$$

where $W_N = e^{-j\frac{2\pi}{N}}$.

FIG. 4

$$MSE_{normalized} = \frac{E\|\hat{h} - h\|^2}{E\|h\|^2} \qquad \text{4-1}$$

where $\underline{h}$ is the actual channel and $\underline{\hat{h}}$ is the MMSE estimation $$C_k = \frac{1}{H_k}, \quad k = 0, 1, \ldots, N-1 \qquad \text{4-2}$$

$$C_k = \frac{H_k^*}{|H_k|^2 + \sigma_n^2/\sigma_a^2} \qquad \text{4-3}$$

ent invention relates to the field of digital communications. More specifically, the present invention provides for a novel initialization system and method for discrete multitone modems.

DISCRETE MULTITONE MODEM INITIALIZATION SYSTEM AND METHOD

PRIORITY DATA

This application is a continuation-in-part of co-pending U.S. patent application Ser. No. 10/064,570, filed Jul. 26, 2002.

BACKGROUND OF INVENTION

1. Field of Invention

The present invention relates to the field of digital communications. More specifically, the present invention provides for a novel initialization system and method for discrete multitone modems.

2. Background of Invention

The demand for high-speed data rate services has been increasing very rapidly. One way to meet this demand is to expand the existing infrastructure by connecting all users of bandwidth-consuming applications to fiber optic networks. However, this solution is not financially viable. An attractive alternative to fiber optics involves the transfer of information at high-speed data rates over ordinary telephone networks using Orthogonal Frequency Division Multiplexing (OFDM). When applied in a wireless environment, it is generally referred to as OFDM, while in a wired environment the term Discrete Multitone (DMT) is more appropriate.

The history of OFDM dates back to 1966, when Robert W. Chang published his paper on the synthesis of bandlimited signals for multichannel transmission without interchannel interference (ICI) and intersymbol interference (ISI). Chang was awarded a patent for his work in 1970. In 1971, S. B. Weistein and P. M. Ebert contributed to OFDM with the use of Discrete Fourier Transform (DFT) to perform baseband modulation and demodulation, removing the need to use banks of subcarrier oscillators. But, Weistein and Ebert's system could not guarantee orthogonality. In 1980, A. Peled and A. Ruiz solved the orthogonality problem with the introduction of the cyclic prefix (CP). OFDM is currently being used as the European Digital Audio Broadcasting (DAB) standard and under the name DMT, has been chosen as the modulation scheme for ADSL, a technique for transmission over twisted pair telephone lines standard and is a major contender in the ongoing VDSL standard for high-speed transmission on the existing telephone network.

The principles of multicarrier modulation are described more completely in "Multicarrier Modulation for Data Transmission: An Idea Whose Time Has Come", by John A. C. Bingham, IEEE Communications Magazine, Vol. 28, No. 5, pages 5–14, May 1990. As is known in a modem system utilizing multicarrier modulation such as DMT, the bits of input data for transmission within each block or symbol period are allocated to sub-carriers.

At the receiver DMT signals are subject to synchronization errors due to oscillator impairments and sample clock differences. The effective implementation of DMT requires that the received signal be recovered with a near perfect synchronization. Two types of synchronizer structures are well known in the art. Data-aided synchronizers use the receiver's decisions or a training sequence to compute the timing offsets. Non-data-aided synchronizers operate independent of the transmitted information sequence. For the NDA approach, the timing estimates maximize the NDA likelihood function, which is obtained by averaging the likelihood function over the random information variables.

A thorough explanation of DMT synchronization can be found in, "Synchronization with DMT Modulation", Thierry Pollet and Miguel Peeters, IEEE Communications Magazine, April 1999, and in, "ML Estimation of Time and Frequency Offset in OFDM Systems", Jan-Jaap van de Beek, IEEE Transactions on Signal Processing, Vol. 45, No. 7, July 1997, both herein incorporated by reference.

It is also necessary for the receiver to perform channel estimation, which allows for compensation of the effects of the transmission medium (ex. telephone line channel). Prior art systems for channel estimation are well known in the art. Channel estimation in OFDM systems is usually performed with the aid known pilot symbols. A detailed explanation of channel estimation and pilot tones can be found in, "Pilot Tone Selection for Channel Estimation in a Mobile OFDM System", Rohit Negi and John Cioffi, IEEE Transactions on Consumer Electronics, Vol. 44, No. 3, August 1998, incorporated herein by reference.

While many techniques for synchronization and channel estimation are known in the art, the prior art systems require complete synchronization prior to channel estimation. A system that efficiently combines synchronization and channel estimation will serve to significantly reduce the start-up time of any communication systems.

SUMMARY OF INVENTION

The longstanding but heretofore unfulfilled need for an improved link initialization method for system level design of a modem using Discrete Multitone (DMT) technique, which enables very high bit-rate transmission and long distance reach over the existing telephone lines is now met by a new, useful, and nonobvious invention.

The present invention can be implemented into a modem system, and into a method of operating the same to initialize the operating conditions of the modem-to-modem session.

The present invention discloses an improved initialization method for modem communication wherein the timing offset required for synchronization is estimated utilizing an entire received DMT frame and the channel impulse response is estimated utilizing the pilot tones received within the same DMT frames utilized for synchronization. In a preferred embodiment of the invention, the timing offset estimation and the channel impulse response are performed simultaneously.

The present invention provides for the incorporation of a plurality of DMT frames and a plurality of pilot tones within the frames.

In a preferred embodiment of the initialization method of the present invention, a plurality of DMT frames of length N+LP are transmitted. The DMT symbol to be transmitted comprises N samples and the associated cyclic prefix has a length of LP samples. Multiple DMT frames are received at a receiver. Interpolation is performed on the received DMT frame. The integer timing offset and the fractional timing offset are then estimated using non-data aided maximum likelihood correlation with a pre-stored frame of length N+LP. For the channel estimation, a Minimum Mean Square Error criterion of the pilot tones received within the plurality of DMT frames is used to estimate the channel impulse response.

The present invention also provides for correction of the integer timing offset in the time-domain and fractional timing offset in the frequency-domain. In one aspect of the invention, symbol timing offset correction is performed in the time-domain responsive to the integer timing offset by adjusting the symbol clock. In another aspect of the invention, sample timing offset correction is performed in the frequency-domain responsive to the fractional timing offset through the delay-rotor property.

The present invention also provides for the synthesis of a 1-tap frequency domain equalizer based on the estimation of the channel impulse response. The channel impulse response is padded with zeroes to accommodate for circular convolution prior to the synthesis of the 1-tap frequency domain equalizer.

In a preferred embodiment of the present invention, known symbols are used for the pilot tones. It is well known that DMT modulation schemes exhibit high peak-to-average power ratio (PAR). It is arguably one of the greatest drawbacks on DMT. High PAR values demand expensive and less efficient linear amplifiers at the analog front-end; therefore, overall system complexity and cost increases significantly. Constellation shaping can be used to reduce the peak power while maintaining the same bit error rate (BER) performance. It has been shown that through constellation shaping, peak power of a DMT signal can be reduced by 3–6 dB without sacrificing bandwidth. Optimal peak power reduction can be achieved through the use of a symmetric spherical QAM constellation as disclosed in co-pending application, U.S. Ser. No. 10/064,570 filed on Jul. 26, 2002.

In another preferred embodiment of the present invention, an optimal set of known pilot tones are transmitted to the receiver.

It is an object of the present invention to provide a method and system for data communications in which transmitting and receiving modems may initialize communications in order to maximize the available data communication rates and accuracy.

It is a further object of the present invention to provide for a fast link initialization between modems without significantly increasing complexity in the system architecture.

It is also an object of the present invention to provide a method and system, which improves the over-all system performance through reduction in symbol errors.

It is another object of the present invention to provide such a method and system that is particularly suited for modems that may be realized in a small number of integrated circuit devices.

The invention accordingly comprises the features of construction, combination of elements, and arrangement of parts that will be exemplified in the description set forth hereinafter and the scope of the invention will be indicated in the claims.

As previously discussed in the background of the invention, OFDM when applied in a wired environment in appropriately referred to as Discrete Multitone (DMT). While the detailed description of the invention is focused on the method and apparatus as applied to a DMT environment, it is within the scope of the invention to apply the methods described in an environment employing various orthogonal multi-carrier signaling systems to include OFDM as well as DMT.

Other aspects and advantages of the present invention can be seen upon review of the figures, the detailed description, and the claims, which follow.

BRIEF DESCRIPTION OF DRAWINGS

For a fuller understanding of the nature and objects of the invention, reference should be made to the following detailed description, taken in connection with the accompanying drawings, in which:

FIG. 2 describes the mathematical formulae of the transmitted signals with noise and the channel impulse response used in present invention FIG. 3 describes the mathematical formulae of the correlation function.

FIG. 4 describes the mathematical calculations of the minimum-mean-square-error (MMSE).

DETAILED DESCRIPTION

As described in detail in, *"Modeling and Simulation of Discretized Data Transmission in Very High-Speed Digital Subscriber Line"*, Dogu Arifler, Ming Ding, and Zukang Shen published in EE382C-9 Embedded Software Systems, Spring 2002, DMT is a form of multi-carrier modulation. In DMT modulation, available bandwidth is divided into multiple narrowband channels. These channels can be viewed as frequency-indexed sub-carriers that are modulated and demodulated independently. To eliminate inter-symbol interference in DMT, it is desirable to have the bandwidths of the sub-channels sufficiently narrow. Substantial research has shown that such a system can provide very high bandwidth efficiency with proper allocation of bits and energies to these sub-channels. An efficient bit allocation algorithm would appropriately assign more bits to the sub-channels with higher signal-to-noise ratios (SNR).

A typical DMT system utilizes a transmitter inverse Fast Fourier Transform (IFFT) and a receiver forward Fast Fourier Transform (FFT). Ideally, a frequency domain equalizer following the receiver FFT can correct the channel frequency distortion. However, the delay spread of the channel in the beginning of the receiver FFT block contains inter-symbol interference from the previous block. As this interference is independent of the current block of data, just the frequency domain equalizer cannot cancel it. The typical solution cyclically pads a block of prefix data in front of the FFT data block on the transmitter side before the block of FFT data is sent to the D/A. This block of prefix data is referred to as the cyclic prefix. The prefix data is a replica of the last few samples of the FFT data block. On the receiver side, the received signal is windowed to remove the cyclic prefix data. If the length of the channel impulse response is shorter than the prefix length, intersymbol interference from the previous FFT data block is completely eliminated. Frequency domain equalizer techniques are then applied to remove intra-symbol interference among DMT subchannels. However, since the channel impulse response varies and is dependent upon each individual channel, there is no guarantee that the length of the impulse response is shorter than the prefix length. Using an adaptive time domain equalizer often shortens the length of the channel impulse response.

Figure 1:
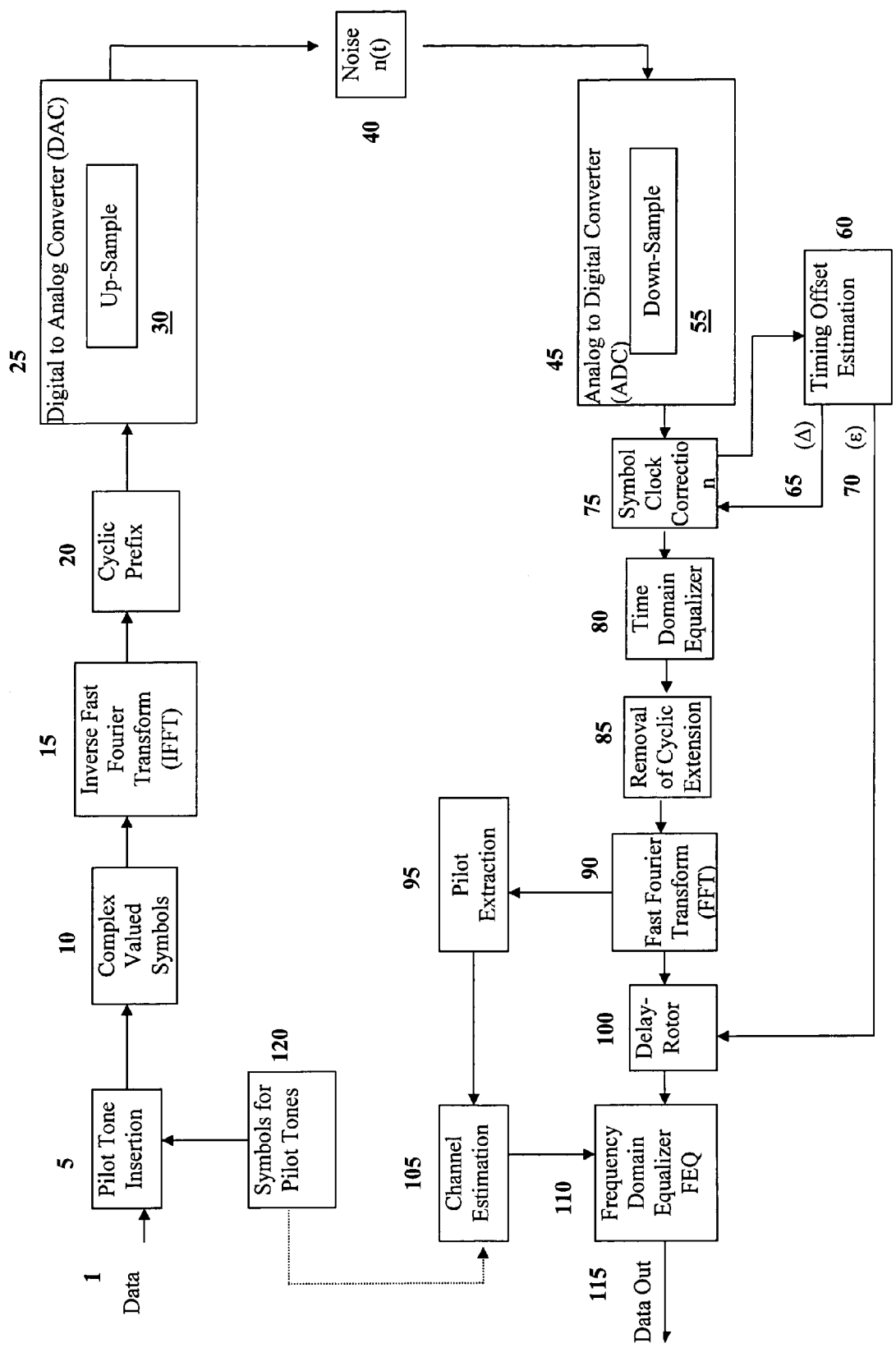
FIG. 1 is a system level diagram of the present invention.

Referring now to FIG. 1, which shows the system level block diagram of a DMT-VDSL modem. In practice DMT exploits the power of Discrete Fourier Transform (DFT), and it is efficiently implemented using Fast Fourier Transform (FFT). In FIG. 1, a typical modem system of the present invention is described. The input bits are received 1.

During modem start-up, certain carriers are used as pilot tones 5. Prior to transmission both transmitter and receiver know the data sent over these tones. Pilot tones are helpful for timing information extraction as well as for channel estimation. The bits are then modulated to provide N complex valued symbols 10, typically Quadrature Amplitude Modulated (QAM) symbols X(k), $0 \leq k \leq N-1$ modulate N orthogonal sub-carriers use IFFT 15 and generate N samples of time-domain signal x (n) as in FIG. 2, 2-1. In DMT, a set of QAM symbols $X^m$ are generated as described in FIG. 2, 2-2. Due to the conjugate symmetric property of the input data, the discrete output signal $x_n$ will have real-valued samples when the Inverse Fast Fourier transform (IFFT) 15 is performed at the transmitter. Prior to the output signal's transmission into the channel, a cyclic prefix is inserted at the beginning of the real DMT time symbol 20 to combat Inter-Symbol Interference (ISI) between adjacent symbols. If the length of the cyclic prefix is larger than the length of the equivalent discrete time channel or the channel impulse response (CIR), then ISI can be effectively eliminated. However, in practical channels the CIR can be equivalent to a large number of samples, when this is the case, synchronization is severely delayed. To overcome large CIR situations, a receiver equalization scheme comprising a T-tap time domain equalizer (TEQ) 80 to shorten the length of the CIR and a frequency domain equalizer (FEQ) 110 consisting of N 1-tap filters are utilized to correct for signal phase rotation and signal amplitude attenuation. To achieve channel partitioning and to avoid inter-symbol interference (ISI), DMT/OFDM extends the modulated transmit vector to satisfy the condition in FIG. 2, 2-3. The result is that the transmit vector is extended by copying the last v samples of the multicarrier symbol at the beginning of the DMT symbol. This is called cyclic prefix (CP) 20. Before transmitting, the signal is up-sampled 30 to match the sampling rate of the D/A converter 25 at the analog front-end. The converter transforms discrete-time samples of the signal into an analog signal, which is transmitted over the communication medium. The transmission medium, telephone line channel, introduces noise 35 40 in addition to attenuation, distortion and phase rotation to the signal 35 40. The received signal with the Channel Impulse Response (CIR) denoted by vector h is shown in FIG. 2, 2-4. This denotes the effects of noise 40 and attenuation due to channel effects 35. The signal arriving at the receiver is down-sampled 55 at the A/D converter 45. The cyclic prefix is removed 85 and the signal is demodulated using FFT 90. The resulting QAM symbol is as shown in FIG. 2, 2-5. Therefore, the overall system equation in frequency-domain can be written as shown in FIG. 2, 2-6.

Since transmitter and receiver do not share the same clock signal, in the beginning they are not synchronized. In order to decode the information properly, the receiver must initially synchronize itself with transmitter. Receiver synchronization is generally performed in two steps timing offset estimation 60 and timing offset correction, through symbol clock correction 75 and delay-rotor property 100. Essentially, synchronization aligns FFT windows of both at the transmitter and the receiver The present invention utilizes Maximum Likelihood (ML) estimation to extract timing offset information. Since it is a non-data aided (NDA) method, the receiving side can perform timing estimation before FFT, and therefore synchronization can be achieved faster.

Figure 5:
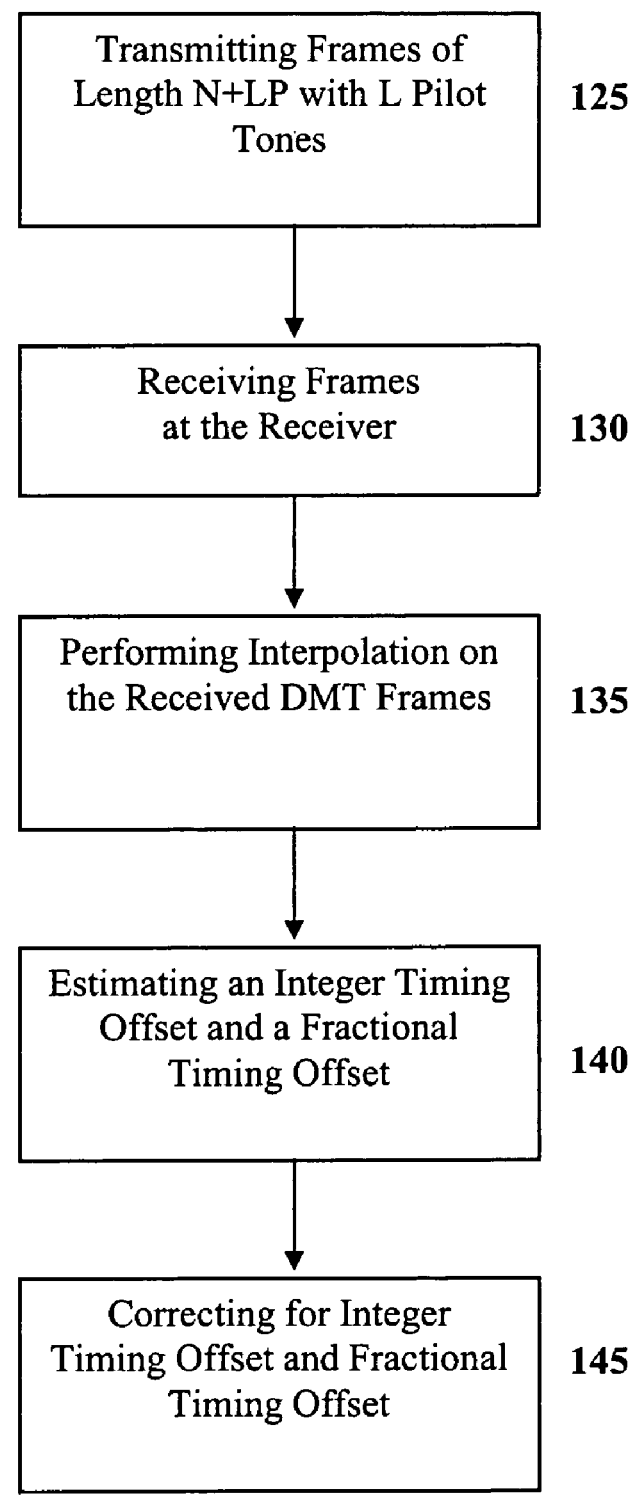
FIG. 5 is a flow diagram of the method for timing estimation.
Figure 6:
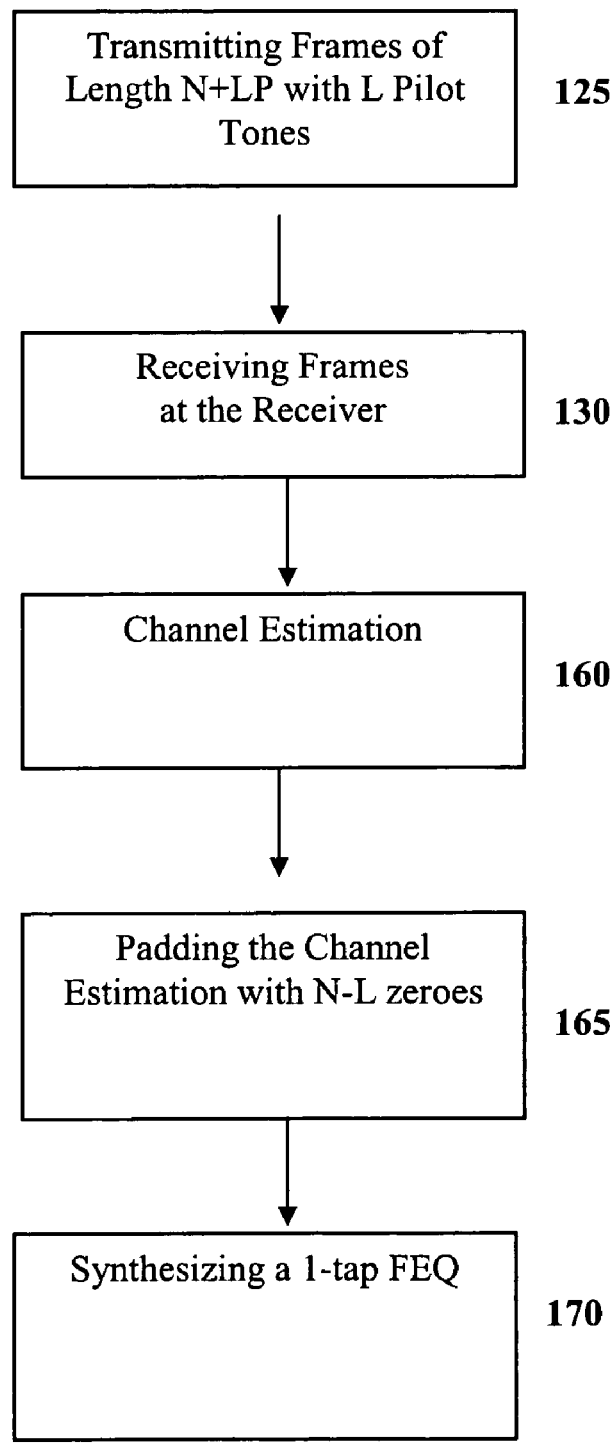
FIG. 6 is a flow diagram of the method for channel estimation.
Figure 7:
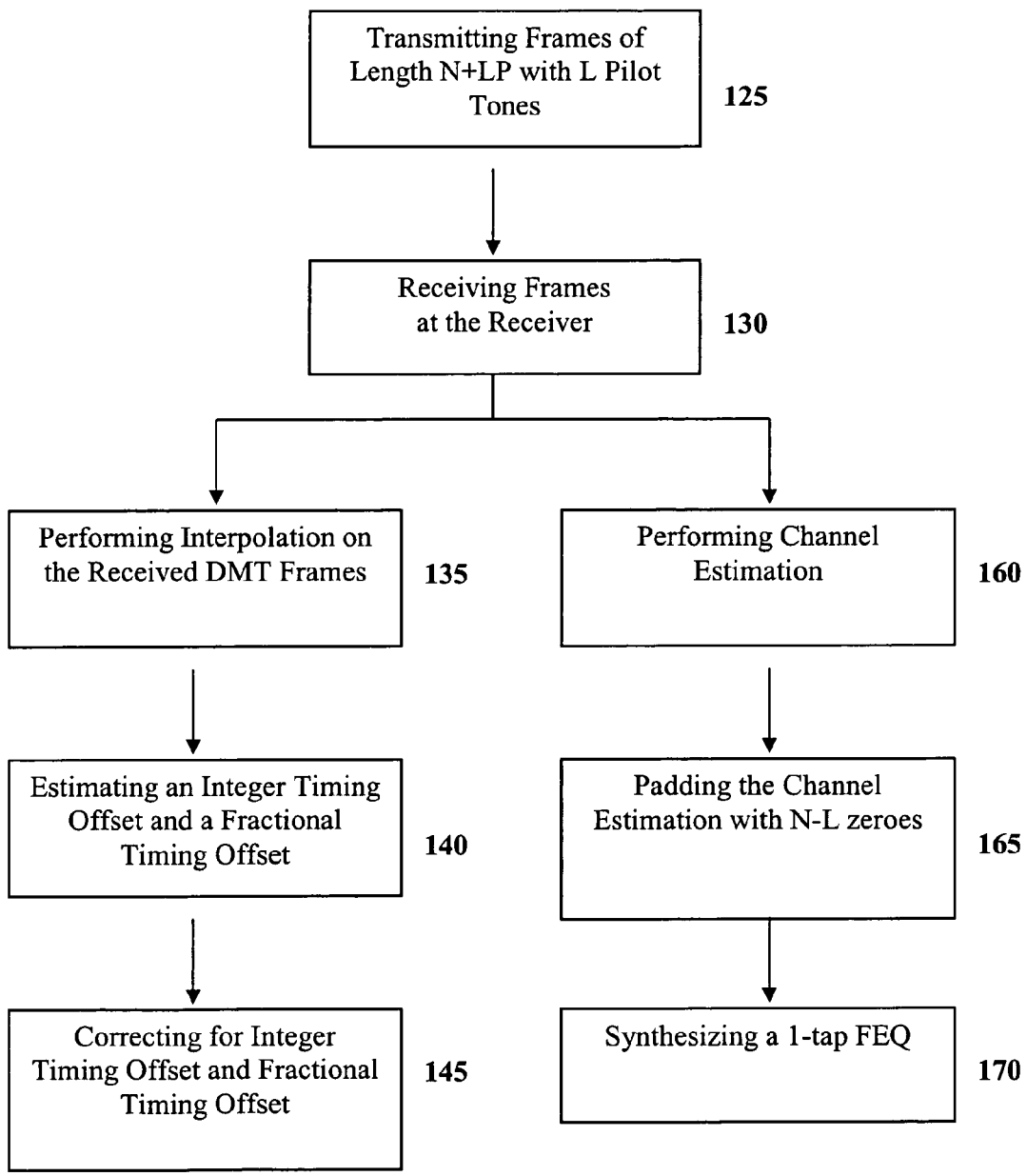
FIG. 7 is a flow diagram of the method for timing estimation, channel estimation and cancellation.

Referring now to FIG. 5 and FIG. 1, according to a method of the present invention a DMT frame of length N+LP is transmitted 125. Let N be the number of samples in a DMT frame, and LP the length of CP. The frame of N+LP samples is received at the receiver 130. Since the CP is generated using last LP samples of total N samples, it yields maximum correlation when aligned with those last LP samples of the DMT frame. This property is utilized to estimate the timing offset information at the receiver 140. At the receiver, the correlation function is calculated for each value of estimated delay as in FIG. 3, 3-1. However, in the presence of severe interference and/or low Signal to Noise Ratio (SNR), a large number of frames are required to extract optimal timing information. The final result is a longer start-up phase for the modem. Therefore, rather than using just LP samples for the calculation of Maximum Likelihood (ML), the present invention uses the whole received DMT frame of N+LP samples to correlate with a pre-stored frame of the same size at the receiver. With the same accuracy, this approach helps to shorten duration of the timing estimation, and therefore reduces start-up overhead. Further, prior to correlation, interpolation is performed on the received frame to estimate integer as well as fractional timing offsets 135. The integer estimate is referred to as the symbol timing offset ($\Delta$) and the fractional estimate is referred to as the sample timing offset ($\epsilon$). Averaging the ($\Delta+\epsilon$) over multiple DMT frames during start-up provides a very accurate estimate of the timing offsets.

Figure 9:
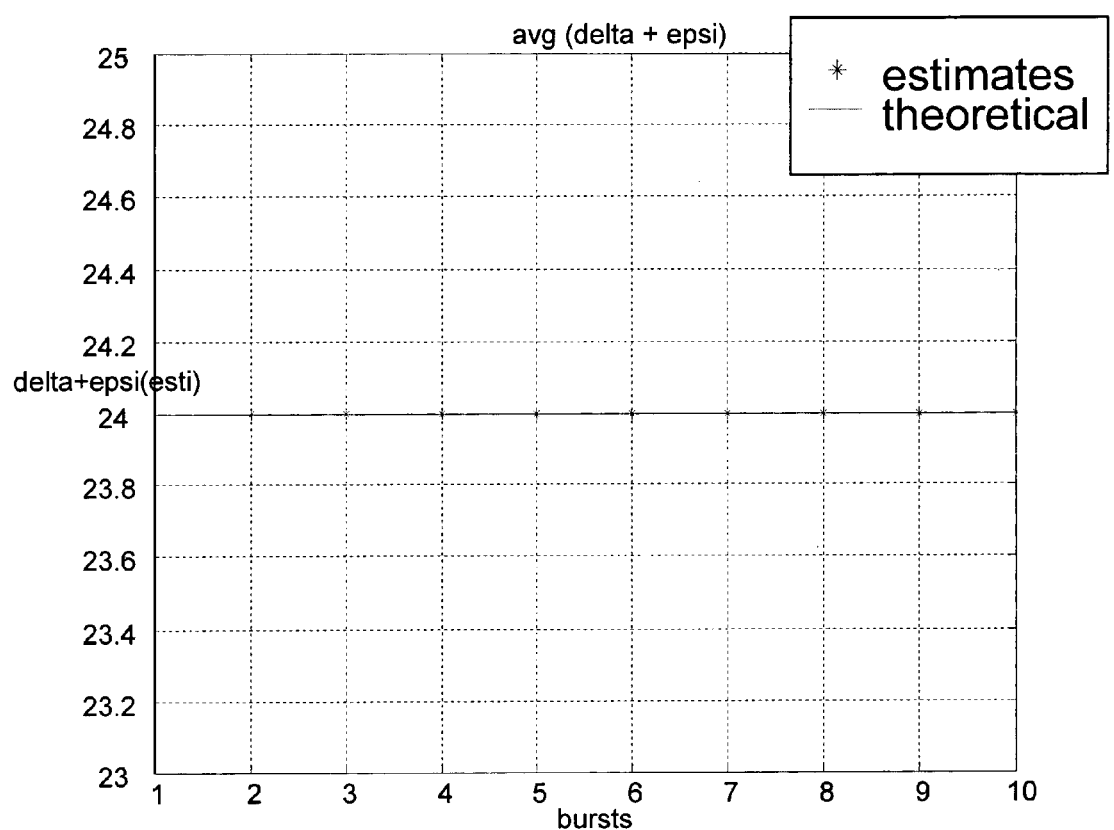
FIG. 9 is diagram of the timing estimation results of the present invention.
Figure 11:
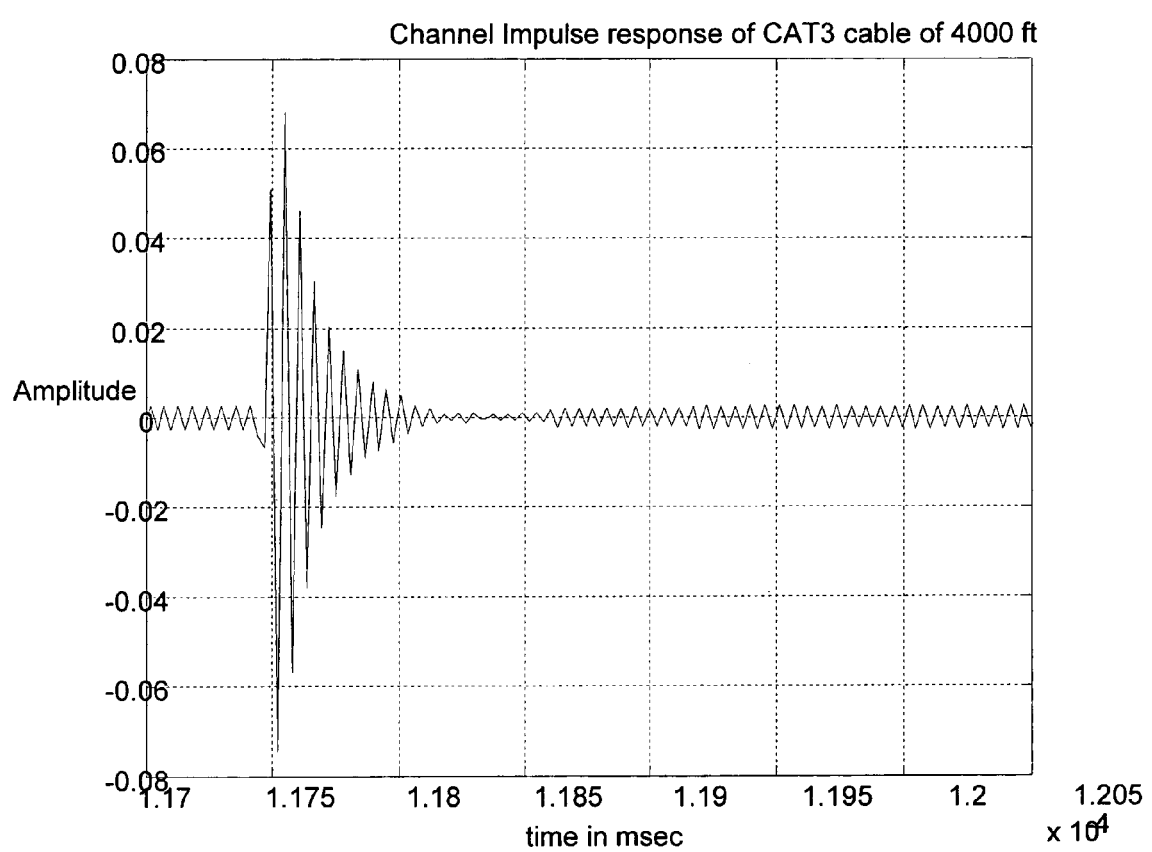
FIG. 11 is a diagram of a typical channel impulse response.

FIG. 9 shows the performance of the ML algorithm with the use of pre-stored frames of length N+LP as taught by the present invention. Simulation parameters were, total 2048 sub-carriers, 256 samples CP, VDSL channel as shown in FIG. 11, D/A sampling frequency 35.328 MHz. Therefore, the data coming from the DMT modulator is interpolated from 17.408 Msps to 35.328 Msps using an up-sampler and a 22-tap half-band filter. For simplicity, all the sub-carriers were assumed carrying 64QAM symbols. At the receive side output of A/D is decimated to 17.408 Msps. FIG. 9 also shows comparison of actual estimate with optimum values.

After the receiver estimates the timing offsets, it should advance or delay its sampling clock by the same amount to get synchronized with the transmitter. This procedure is called timing offset correction. The receiver does correction for symbol timing offset ($\Delta$) 65 in time-domain through delaying or advancing the symbol clock 75 by integer number of samples 145. And compensation for the fractional sample timing offset ($\epsilon$) 70 is done in frequency domain 145 through the delay-rotor property 100.

The receiver also performs channel estimation so that it can compensate for the effects of the telephone line channel. Prior art systems are adapted to perform channel estimation after synchronization. The present invention provides a novel solution that allows for the simultaneous estimation of timing offsets and the channel response. The present invention model uses certain carriers as pilot tones, and the transmitter sends known QAM symbols over these pilot tones 125. At the receiver 130 this information is used to estimate the effect of the channel. The present invention utilizes one of the optimal sets of pilot tones. Within a total of N subcarriers, the optimum set of L pilot tones are selected as shown in FIG. 3-2.

Assuming the channel to be time-invariant over a DMT frame and the noise to be white gaussian, overall input-output relationship of the equation shown in FIG. 2-6 can be written as shown in FIG. 3-3. Using the minimum mean square error (MMSE) criterion the estimated channel impulse response is given 160 as shown in FIG. 3-4. The normalized mean square error (MSE) in channel estimation is defined as in FIG. 4-1.

Figure 10:
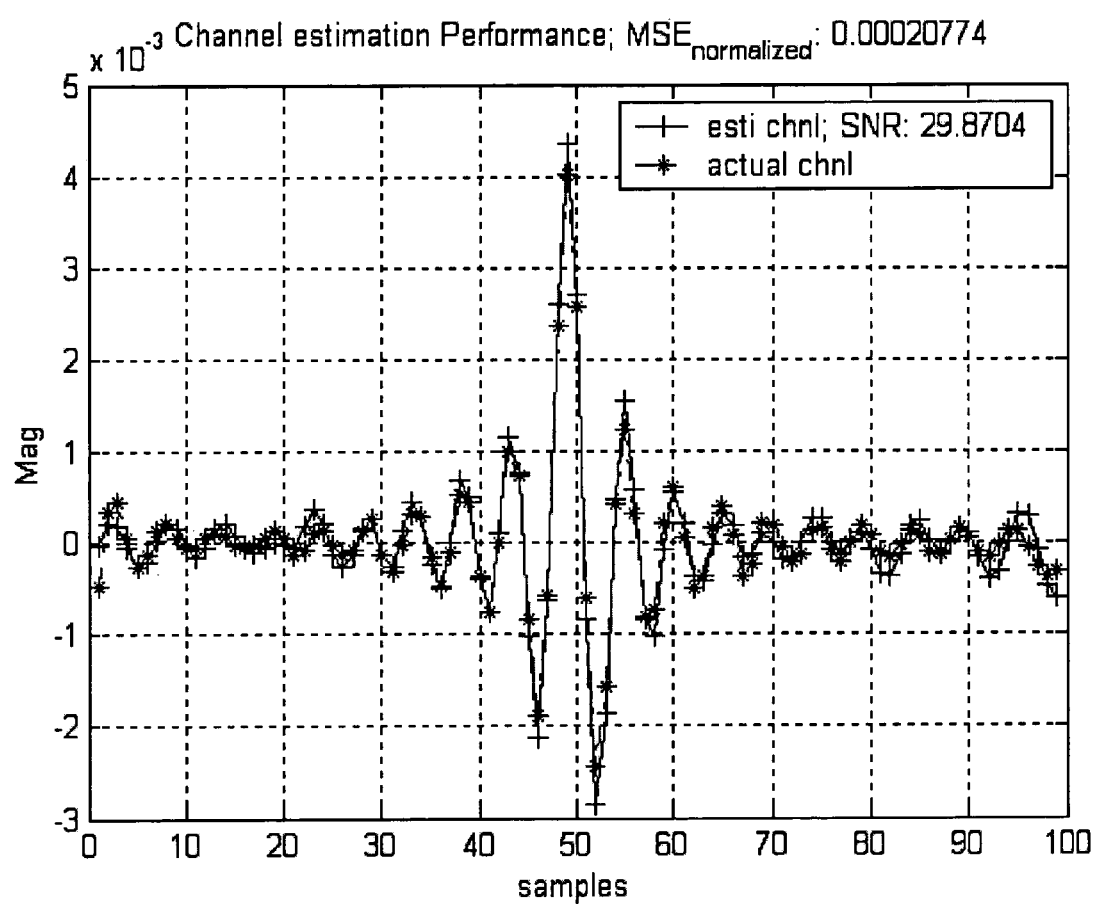
FIG. 10 is a diagram of the channel estimation results of the present invention.

The comparison of the actual channel with its estimation is shown in FIG. 10. MSE normalized was found to be $2.07 \times 10^{-4}$ or approximately −36 dB, which is quite low, and hence the estimation is very accurate.

The estimated channel impulse response has a total of L samples. This process of channel estimation is repeated over a burst of DMT frames, and the impulse response is found by averaging them. It helps to reduce the effect of AWGN, and reduces MSE. After the channel estimation is completed, the modem synthesizes a 1-tap frequency domain equalizer (1FEQ) 170, one complex valued tap per carrier. It can be implemented by multiplying the FFT output with a complex multiplier (tap). Essentially in absence of noise, it is a zero forcing (ZF) equalizer, and the individual tap values are given by FIG. 4-2. And when AWGN is present, according to MMSE criterion the individual tap weights can be calculated as shown in FIG. 4-3.

Although 1FEQ is straightforward to implement, it can efficiently compensate most for channel attenuation and phase rotation. It should be noted that a circular convolution problem is encountered with 1FEQ. This can be easily understood by referring to the respective operations of the channel and the equalizer. The channel effects are a linear convolution of the incoming signal and the CIR. In contrast, the 1FEQ attempts to invert the channel effects after the FFT. It is therefore a circular convolution operation. In response to the circular convolution problem, the channel impulse response is padded with (N−L) zeros 765, which makes the CIR period the same as that of the incoming DMT frame.

Figure 8:
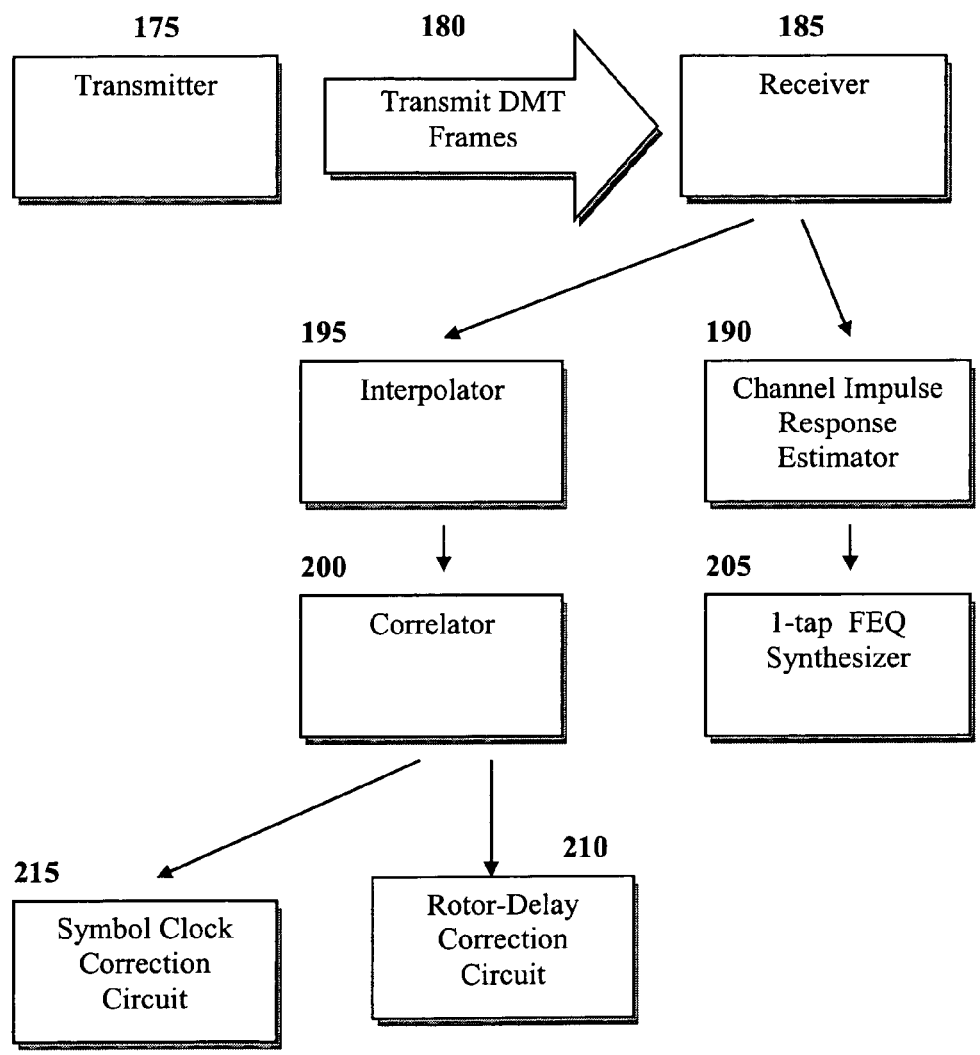
FIG. 8 is a block diagram of the present invention.

FIG. 8 shows an illustrative example of a system embodied by the present invention. A transmitter 175 transmits the DMT frames as previously described 180. The receiver receives the frames 185. At the receiving side, an interpolator 195 and a correlator 200 provide the timing offset estimations to the symbol clock correction circuit 215 and the rotor delay correction circuit 210. The received frames are acted upon by the channel impulse response estimator 190 and the estimation is fed to the synthesizer 205 to enable equalization.

As described, the present invention discloses a new useful and nonobvious solution for DMT modem initialization. The present invention discloses a unique combination of timing offset estimation and channel estimation. This unique combination provides an improved system and method for fast link initialization between modems without significantly increasing complexity in the system architecture.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall there between.

Now that the invention has been described,

What is claimed is:

1. An improved initialization method for a communication system comprising the steps of:
   estimating a timing offset utilizing non-data aided correlation with an entire received DMT frame, wherein the timing offset further comprises an integer timing offset and a fractional timing offset; and
   estimating a channel impulse response utilizing at least one pilot tone, wherein the received DMT frame further comprises the at least one pilot tone.

2. The method of claim 1, wherein the steps of estimating a timing offset and estimating a channel impulse response are performed substantially simultaneously.

3. The method of claim 1, wherein the received DMT frame comprises a plurality of DMT frames.

4. The method of claim 1, wherein the at least one pilot tone further comprises a plurality of pilot tones.

5. The method of claim 1, wherein the step of estimating timing offset information further comprises the steps of:
   transmitting a plurality of DMT frames of length N+LP, where N is equal to the number of samples comprising the DMT symbol and LP is equal to the number of samples comprising a cyclic prefix;
   receiving the plurality of DMT frames at a receiver;
   performing interpolation on the received DMT frames; and
   estimating an integer timing offset and a fractional timing offset from the DMT frames utilizing non-data aided maximum likelihood correlation with a pre-stored frame of length N+LP.

6. The method of claim 5, further comprising the step of correcting for the integer timing offset in the time-domain.

7. The method of claim 5, further comprising the step of correcting for the fractional timing offset in the frequency-domain.

8. The method of claim 1, wherein the step of estimating the channel impulse response further comprises the steps of:
   transmitting a plurality of DMT frames comprising a plurality of known pilot tones;
   receiving the DMT frames coincident with modem synchronization; and
   estimating the channel impulse response utilizing MMSE criterion through the pilot tones.

9. The method of claim 8, further comprising synthesizing a frequency domain equalizer based on the estimation of the channel impulse response.

10. The method of claim 9, wherein the channel impulse response is padded with zeroes to accommodate for circular convolution prior to synthesizing the frequency domain equalizer.

11. The method of claim 8, wherein the plurality of pilot tones further comprises pilot tones modulated with a known symbol.

12. The method of claim 1 further comprising performing interpolation on the received DM frame.

13. The method of claim 1, wherein the step of estimating the timing offset further comprises:
   performing interpolation on the received DMT frame; and
   estimating an integer timing offset and a fractional timing offset from the DMT frame utilizing non-data aided maximum likelihood correlation with a pre-stored frame.

14. The method of claim 13, further comprising the step of correcting for the integer timing offset in the time-domain.

15. The method of claim 13, further comprising the step of correcting for the fractional timing offset in the frequency-domain.

16. An improved method of estimating a timing offset comprising the steps of:
   receiving an entire DMT frame; and
   utilizing the entire received DMT frame to estimate the timing offset through non-data aided correlation.

17. The method of claim 16, wherein the received DMT frame comprises a plurality of DMT frames.

18. The method of claim 16, further comprising the steps of:
transmitting a plurality of DMT frames of length N+LP, where N is equal to the number of samples comprising the DMT symbol and LP is equal to the number of samples comprising a cyclic prefix;
receiving the plurality of DMT frames at a receiver;
performing interpolation on the received DMT frames; and
estimating an integer timing offset and a fractional timing offset from the DMT frames utilizing non-data aided maximum likelihood correlation with a frame of length N+LP.

19. The method of claim 18, further comprising correcting for the symbol timing offset in the time-domain responsive to the integer timing offset.

20. The method of claim 18, further comprising correcting for the sample timing offset in the frequency-domain responsive to the fractional timing offset.

21. An improved method of estimating a channel impulse response comprising the steps of:
receiving a DMT frame during modem synchronization, the DMT frame further comprising at least one pilot tone;
utilizing the at least one pilot tone to estimate the channel impulse response.

22. The method of claim 21, wherein the received DMT frame comprises a plurality of DMT frames.

23. The method of claim 21, wherein the at least one pilot tone further comprises a plurality of pilot tones.

24. The method of claim 21, further comprises estimating the channel impulse response utilizing Minimum Mean Square Error criterion for the known pilot tones.

25. The method of claim 24, further comprising synthesizing a frequency domain equalizer based on the estimation of the channel impulse response.

26. The method of claim 25, wherein the channel impulse response is padded with zeroes to accommodate for circular convolution prior to synthesizing the frequency domain equalizer.

27. The method of claim 24, wherein the plurality of pilot tones further comprise pilot tones modulated with a known symbol.

28. An improved initialization method for modern communication comprising the steps of:
transmitting a plurality of DMT frames of length N+LP, where N is equal to the number of samples comprising the DMT symbol and LP is equal to the number of samples comprising a cyclic prefix
transmitting a plurality of pilot tones within the plurality of DMT frames;
receiving the plurality of DMT frames at the receiver;
extracting timing offset information from the DMT frames through non-data aided correlation with a pre-stored DMT frame, wherein correlation is performed using the entire DMT frame of N+LP samples;
performing interpolation on the received DMT frames resulting in an integer timing offset and a fractional timing offset; and
estimating the channel impulse response from the plurality of pilot tones within the received DMT frames.

29. The method of claim 28, further comprising:
correcting for a symbol timing offset in the time-domain responsive to the integer timing offset; and
correcting for a sample timing offset in the frequency-domain responsive to the fractional timing offset.

30. The method of claim 28, further comprises synthesizing a frequency domain equalizer based on the estimation of the channel impulse response.

31. The method of claim 30, wherein the channel impulse response is padded with zeroes to accommodate for circular convolution prior to synthesizing the frequency domain equalizer.

32. The method of claim 28, wherein the plurality of pilot tones further comprise pilot tones modulated with a known symbol.

33. An improved initialization method for modem communication comprising the steps of:
transmitting a plurality of DMT frames of length N+LP, where N is equal to the number of samples comprising the DMT symbol and LP is equal to the number of samples comprising a cyclic prefix
transmitting a plurality of known symbols over L known pilot tones within the plurality of DMT frames;
receiving the plurality of DMT frames at the receiver;
performing interpolation on the received DMT frames;
estimating an integer timing offset and a fractional timing offset from the DMT frames through non-data aided correlation with a pre-stored DMT frame, wherein correlation is performed using the entire DMT frame of N+LP samples;
correcting for a symbol timing offset in the time-domain responsive to the integer timing offset;
correcting for a sample timing offset in the frequency-domain responsive to the fractional timing offset;
estimating the channel impulse response utilizing the L pilot tones within the received DMT frames;
padding the channel impulse response with (N−L) zeroes; and
synthesizing a 1-tap frequency domain equalizer based on the channel impulse response.

34. An improved system for modem communication comprising:
a timing offset estimator adapted to estimate a timing offset utilizing an entire received DMT frame, wherein the timing offset further comprises an integer timing offset and a fractional timing offset; and
a channel impulse response estimator adapted to estimate a channel impulse utilizing at least one pilot tone, wherein the received DMT frame further comprises the at least one pilot tone.

35. The system of claim 34, wherein the timing offset estimator and the channel impulse response estimator are adapted to operate substantially simultaneously.

36. The system of claim 34, wherein the received DMT frame comprises a plurality of DMT frames.

37. The system of claim 34, wherein the at least one pilot tone further comprises a plurality of pilot tones.

38. The system of claim 34, wherein the timing offset estimator further comprises:
a transmitter adapted to transmit a plurality of DMT frames of length N+LP, where N is equal to the number of samples comprising the DMT symbol and LP is equal to the number of samples comprising a cyclic prefix;
a receiver adapted to receive the plurality of DMT frames;
an interpolator adapted to perform interpolation on the received DMT frames; and
a correlator adapted to estimate an integer timing offset and a fractional timing offset from the DMT frames utilizing non-data aided maximum likelihood correlation with a pre-stored frame of length N+LP.

39. The system of claim 38, further comprising a symbol clock correction circuit adapted to correct a symbol timing offset in the time-domain responsive to the integer timing offset.

40. The system of claim 38, further comprising a rotor-delay correction circuit adapted to correct a sample timing offset in the frequency-domain responsive to the fractional timing offset.

41. The system of claim 34, wherein the channel impulse response estimator estimates the channel response utilizing a Minimum Mean Square Error criterion of the known pilot tones.

42. The system of claim 41, further comprising a synthesizer adapted to synthesize a frequency domain equalizer based on the estimation of the channel impulse response.

43. The system of claim 42, wherein the channel impulse response is padded with zeroes to accommodate for circular convolution prior to synthesizing the frequency domain equalizer.

44. The method of claim 41, wherein the plurality of pilot tones further comprise pilot tones modulated with a known QAM symbol.

45. The system of claim 34, further comprising, an interpolator adapted to perform interpolation on the received DMT frame.

46. The system of claim 34, further comprising:
an interpolator adapted to perform interpolation on the received DMT frame; and
a correlator adapted to estimate an integer timing offset and a fractional timing offset from the DMT frames utilizing non-data aided maximum likelihood correlation with a pre-stored frame.

47. The system of claim 46, further comprising a symbol clock correction circuit adapted to correct a symbol timing offset in the time-domain responsive to the integer timing offset.

48. The system of claim 46, further comprising a rotor-delay correction circuit adapted to correct a sample timing offset in the frequency-domain responsive to the fractional timing offset.

49. An improved system for estimating a timing offset, the system comprising a timing offset estimator, the timing offset estimator further comprising:
an interpolator adapted to perform interpolation on an entire received DMT frame; and
a correlator adapted to estimate an integer timing offset and a fractional timing offset from the entire received DMT frame utilizing non-data aided correlation.

50. The system of claim 49, wherein the received DMT frame comprises a plurality of DMT frames.

51. The system of claim 49, wherein the timing offset estimator further comprises:
a transmitter adapted to transmit a plurality of DMT frames of length N+LP, where N is equal to the number of samples comprising the DMT symbol and LP is equal to the number of samples comprising a cyclic prefix;
a receiver adapted to receive the plurality of DMT frames;
an interpolator adapted to perform interpolation on the received DMT frames; and
a correlator adapted to estimate an integer timing offset and a fractional timing offset from the DMT frames utilizing non-data aided maximum likelihood correlation with a pre-stored frame of length N+LP.

52. The system of claim 51, further comprising correcting a symbol clock correction circuit adapted to correct a symbol timing offset in the time-domain responsive to the integer timing offset.

53. The system of claim 51, further comprising a rotor-delay correction circuit adapted to correct a sample timing offset in the frequency-domain responsive to the fractional timing offset.

54. An improved system for estimating a channel impulse response, the system comprising:
a receiver to receive a DMT frame, the DMT frame being received during modem synchronization and the DMT frame further comprising at least one pilot tone; and
a channel impulse response estimator to estimate the channel impulse response utilizing the at least one pilot tone.

55. The system of claim 54, wherein the received DMT frame comprises a plurality of DMT frames.

56. The system of claim 54, wherein the at least one pilot tone further comprises a plurality of pilot tones.

57. The system of claim 54, wherein a channel impulse response estimator estimates the channel response utilizing a Minimum Mean Square Error criterion of the known pilot tones.

58. The system of claim 57, further comprising a synthesizer adapted to synthesize a frequency domain equalizer based on the estimation of the channel impulse response.

59. The system of claim 58, wherein the channel impulse response is padded with zeroes to accommodate for circular convolution prior to synthesizing the frequency domain equalizer.

60. The system of claim 54, wherein the plurality of pilot tones further comprise pilot tones modulated with a known symbol.

61. An improved system for modem communication comprising the steps of:
a transmitter adapted to transmit a plurality of DMT frames of length N+LP, where N is equal to the number of samples comprising the DMT symbol and LP is equal to the number of samples comprising a cyclic prefix
the transmitter adapted to transmit a plurality of pilot tones within the plurality of DMT frames;
a receiver adapted to receive the plurality of DMT;
a timing offset estimator adapted to estimate a timing offset from the DMT frames through non-data aided correlation with a pre-stored DMT frame, wherein correlation is performed using the entire DMT frame of N+LP samples;
an interpolator adapted to interpolate the received DMT frames resulting in an integer timing offset and a fractional timing offset; and
a channel impulse estimator adapted to estimate the channel impulse response from the plurality of pilot tones within the received DMT frames.

62. The system of claim 61, further comprising:
a symbol clock correction circuit adapted to correct a symbol timing offset in the time-domain responsive to the integer timing offset; and
a rotor-delay correction circuit adapted to correct a sample timing offset in the frequency-domain responsive to the fractional timing offset.

63. The system of claim 61, further comprising a synthesizer adapted to synthesize a frequency domain equalizer based on the estimation of the channel impulse response.

64. The system of claim 63, wherein the channel impulse response is padded with zeroes to accommodate for circular convolution prior to synthesizing the frequency domain equalizer.

65. The system of claim 61, wherein the plurality of pilot tones further comprise pilot tones modulated with a known symbol.

66. An improved system for modem communication comprising:

a transmitter adapted to transmit a plurality of DMT frames of length N+LP, where N is equal to the number of samples comprising the DMT symbol and LP is equal to the number of samples comprising a cyclic prefix the transmitter transmitting a plurality of known symbols over L known pilot tones within the plurality of DMT frames;

a receiver adapted to receive the plurality of DMT frames;

an interpolator adapted to interpolate the received DMT frames;

a timing offset estimator adapted to estimate an integer timing offset and a fractional timing offset from the DMT frames through non-data aided correlation with a pre-stored DMT frame, wherein correlation is performed using the entire DMT frame of N+LP samples;

a symbol clock corrector circuit adapted to correct a symbol timing offset in the time-domain responsive to the integer timing offset;

a delay-rotor circuit adapted to correct a sample timing offset in the frequency-domain responsive to the fractional timing offset;

a channel impulse response estimator adapted to estimate the channel impulse response utilizing the L pilot tones within the received DMT frames;

a circular convolution circuit adapted to pad the channel impulse response with (N−L) zeroes; and a synthesizer adapted to synthesize a frequency domain based on the channel impulse response.

* * * * *